Sept. 27, 1938.   W. A. DUFFIELD   2,131,619
AUTOMATIC POWER TRANSMISSION
Filed Jan. 7, 1935   2 Sheets-Sheet 1

William A. Duffield
INVENTOR
BY
ATTORNEY

Sept. 27, 1938. W. A. DUFFIELD 2,131,619
AUTOMATIC POWER TRANSMISSION
Filed Jan. 7, 1935 2 Sheets-Sheet 2

William A. Duffield
INVENTOR
BY
ATTORNEY

Patented Sept. 27, 1938

2,131,619

UNITED STATES PATENT OFFICE 2,131,619

AUTOMATIC POWER TRANSMISSION

William A. Duffield, Montreal, Quebec, Canada, assignor to Juno Corporation Limited, Montreal, Quebec, Canada, a corporation Application January 7, 1935, Serial No. 709

7 Claims. (Cl. 74—293)

This invention relates to variable speed power transmission and particularly to the automatic operation of transmission mechanism of this type.

The object of the invention is to provide mechanism whereby the power from a prime mover will be applied to an operative mechanism at the desired speed without the manual control of gear changing apparatus.

A further object is to provide a power transmission that will automatically meet variations of load without such manual control.

A further object is to provide a power transmission that can be gradually thrown into a reverse drive.

Further objects will be set forth hereinafter.

Briefly stated this invention consists of a rotary drive which includes a fluid coupling of the Fottinger type and a train of planetary gear, so arranged that at low speed or at heavy loads the drive will be indirect, while at high speed or light loads the drive will be direct. Changes between these extremes are carried out automatically by the invention.

The fluid coupling operates to gradually speed up the annulus and thereby decreases the rotation of the planets and the drive becomes direct from the pinion and carrier to the tail shaft.

The device is particularly suited for an automobile transmission as the change of speed of the drive is controlled by the accelerator and automatically adjusts itself to every rate of rotation, both ascending and descending.

Reference is made to the accompanying drawings which illustrate the application of the invention to an automobile transmission.

This is only one of the many forms in which the invention may be applied and which are covered by the claims that follow the description.

Figure 1:
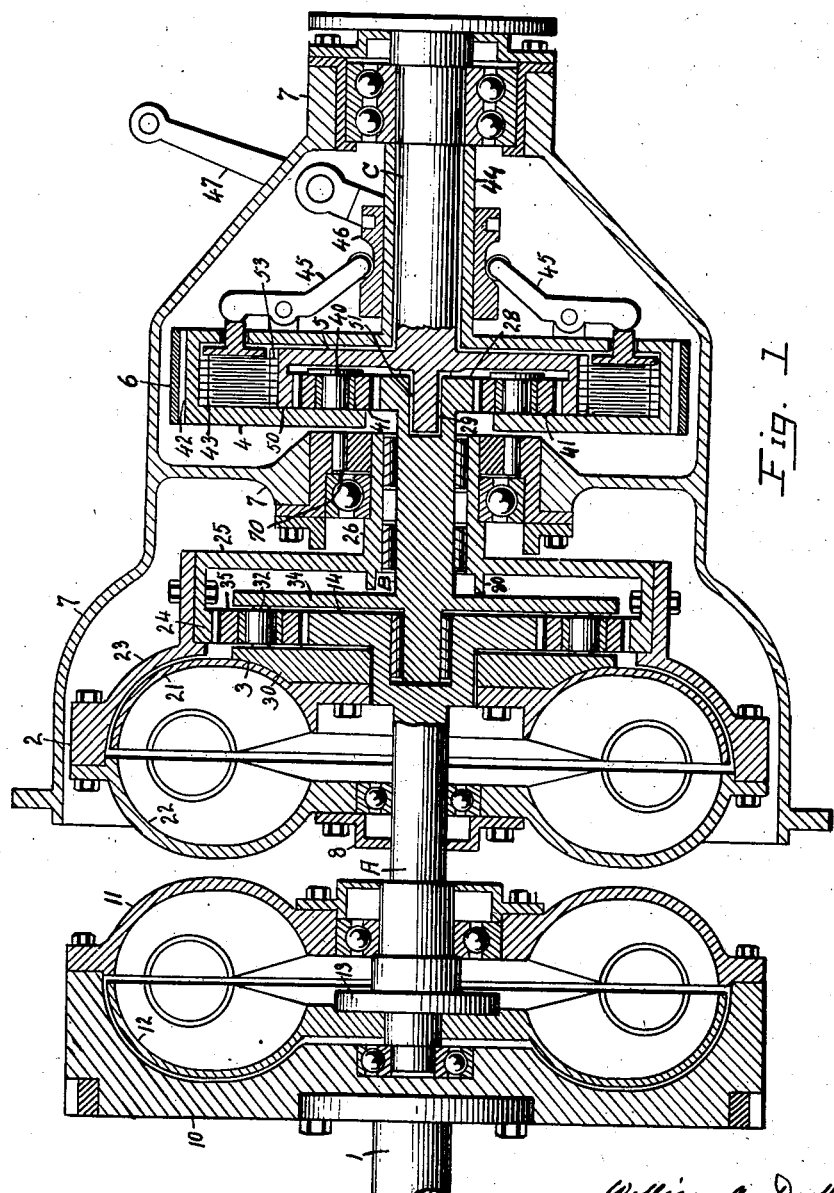
Figure 1 is a vertical longitudinal section through the axis of the shafts of the transmission mechanism.

In Figure 1 the stub 1 from the prime mover is coupled to the shaft A by a clutch. This clutch is shown in the form of a fluid coupling of the Fottinger type.

This form of clutch is not essential to the invention and may be substituted by other forms, but I prefer to employ this form for its many advantages.

The fly wheel 10 which is secured to the stub shaft 1, has a concentric bowl shaped channel. This channel forms a cover to the runner 12 of the fluid coupling. The driver 11 is bolted at its periphery to the fly wheel 10 and is journalled at its center on bearings about shaft A.

The runner 12 is bolted at its center to a flange 13 on the shaft A. The end of the shaft is journalled in bearings in the center of the fly wheel 10. The shaft A has a pinion 14 at the outer end. The pinion end of the shaft is bored to hold bearings for shaft B.

The shaft B is also journalled in bearings in the frame 7.

Shaft B is bored at 29 to hold bearings for the end 51 of the tail shaft C which is also journalled in bearings at the end of frame 7.

Shaft B has a disc 34 which with a disc 30 forms a carrier 3 with pins 32 journalling planet gears 35 which mesh with the pinion 14.

An annulus 24 meshes with the planet gears 35 and has a disc 25 and a sleeve 26. A one-way brake 70 is provided between the sleeve 26 and the frame 7.

The carrier 3 is bolted to the driver 21 of the fluid coupling 2.

The annulus 24 is bolted to the runner 22 which is journalled on the shaft A.

The sleeve 26 is journalled on the shaft B and in the frame 7.

A stuffing box 8 on the shaft A bolted to the runner 22 and a stuffing box 80 on the disc 25 of the annulus 24 around shaft B provide an enclosed chamber, including the fluid coupling and the planetary gear.

Suitable reversing gear is connected to the shaft C.

In this, shaft C has a flanged disc 5. The flange 50 has teeth on its inner side forming an annulus, its outer side carries a series of disc clutch plates 53. A carrier 4 supported on a sleeve 44 journalled on the shaft C, pivotally supports a series of planetary gears 41 which mesh with the pinion 28 and the annulus 50. The carrier 4 also supports at 42 the outer series of discs 43 of the disc clutch, and a set of pivoted levers 45 to operate the clutch. A rocking lever 47 and sliding sleeve 46 operate the clutch levers 45.

A brake band 6 surrounds the carrier 4 provided with suitable control mechanism 60.

The frame covers the fluid coupling and reduction gear and is very compact.

The operation is as follows:—

The prime mover drives the stub shaft and rotates the fly wheel and with it the driver of the fluid coupling. When the speed of 500 R. P. M. is reached the slip between the members of the coupling is 100% but as the speed increases the slip rapidly drops and the runner takes up the drive which it carries through the shaft A to the pinion 14.

When the clutch closes and the shaft A starts to rotate, the pinion causes the planet gear to rotate in the reverse direction but as the annulus is held from reverse rotation by the one-way brake, the planets travel on the annulus and rotate the carrier. This causes the shaft B to rotate at a reduced speed and also causes the driver of the fluid coupling to rotate. As the speed of rotation of the shaft A increases, the rotation of the driver starts the runner to rotate.

The annulus therefore starts to rotate and the sleeve slips over the one-way brake. As the speed of rotation of the annulus increases that of the planets drops and the reduction effects falls gradually until finally the whole assembly of shaft A, planetary gear, fluid coupling, and shaft B are rotating at the same speed as a unit.

This is the normal high speed drive and the reduction mechanism merely acts as a fly wheel.

When the speed is reduced or when the load is increased as in climbing a hill, the annulus slows down and the planets take up the drive and brings in the reduction gradually and smoothly and without any manual or pedal effort from the car drive.

The oil which is in the fluid coupling also keeps the reduction gear lubricated, but at high speed it is held by centrifugal force and ceases to flow, when the mechanism rotates as a unit. This prevents heating of the oil at normal high speed.

At low speeds the oil is effective as a lubricant to all the moving parts between the stuffing boxes.

Figure 2:
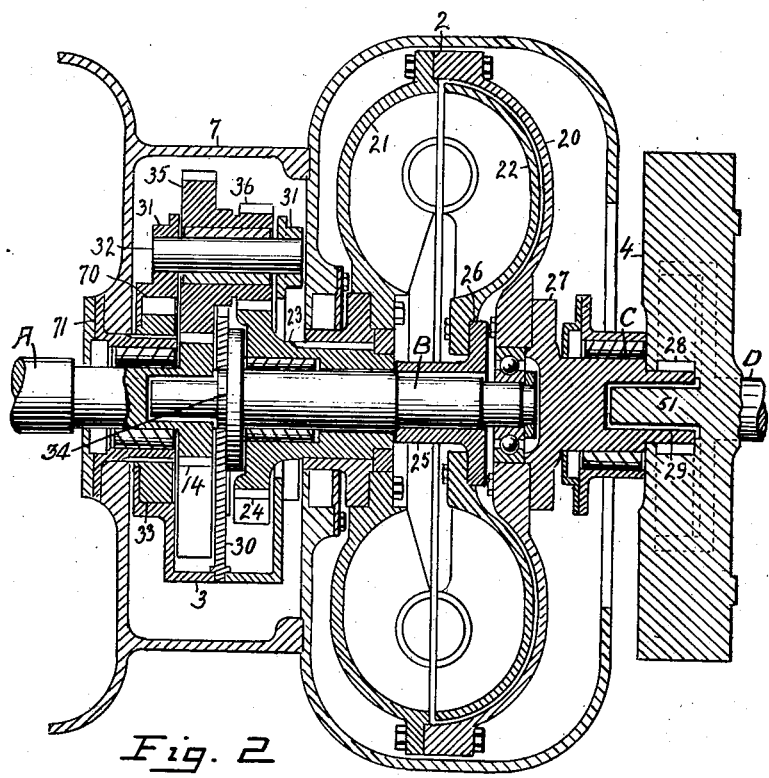
Figure 2 is a similar section of a variation.
Figure 3:
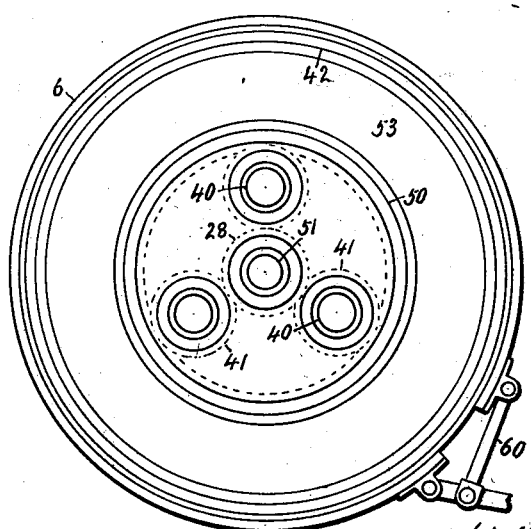
Figure 3 is a vertical cross section of the reversing gear.

In the variation shown in Figure 2 the planetary gear is on the drive side of the fluid coupling.

The shaft A has a pinion 14 at the other end, and is journalled in bearings in a sleeve 71 secured to the frame 7. The pinion end of the shaft A is bored to hold bearings for shaft B.

The shaft B is also journalled in bearings secured to shaft C which is journalled in bearings in the frame 7.

Shaft C is bored at 29 to hold bearings for the end 51 of the shaft D which is also journalled in bearings at the end of the frame 7.

The shaft B has a flange 34 to which is bolted the spider 30 of a carrier 3. Mounted in bearings 31 on the walls of the carrier 3 are pins 32 on which are journalled integral large and small planet gears 35 and 36. The larger gears 35 mesh with the pinion 14 of shaft A. The carrier 3 at one side has a flanged ring 33 which rides on a one-way brake 70 supported on the frame 7.

Beyond the flange 34, a sleeve 23 journalled on bearings around shaft B has at its end a gear 24 meshing with the smaller planetary gears 36.

Keyed to the sleeve 23 is a ring bolted to the driver 21 of the fluid coupling 2. At the periphery of this member 21, it is bolted to a bowl shaped cover 20 of the coupling 2.

At its center this cover 20 is bolted to a flange 27 on shaft C. Shaft C carries a pinion 28 at its opposite end, meshing with the planets 41 of the reversing gear.

The runner of the fluid coupling is bolted to the flange 26 of a sleeve 25 keyed to the shaft B.

The operation of this arrangement of planetary gear is as follows:

The drive of the pinion 14 is through the planet gears 35 and 36 and gear 24 sleeve 23 to the driver 21, thence through the cover 20 to shaft C. The carrier 3 is held from reverse rotation by the one-way brake 70. When the runner 22 starts to couple with the driver 21 it causes the carrier 3 to slip over the one-way brake 70 and rotate in the same direction as shaft A and sleeve 23.

As the speed of rotation of the carrier 3 increases that of the planetary gear slows down until the rotation of the pinion 14 and the sleeve 23 is synchronized and the reduction effect of the planetary gears has ceased.

The drive is then direct through the mechanism to the pinion 28 of the reversing gear.

Other variations of planetary gear with a fluid coupling for the same purpose may be used. But the operation of the fluid coupling to gradually and automatically cut in or out the reduction gear is the essential feature of this invention.

I claim:

1. In an automatic power transmission, a fluid coupling of the Fottinger type, means to transmit power through a train of reduction gear to a tail shaft and also directly from the gear to the driver of the coupling, and means coupled to the runner including a one-way brake adapted to cut out the reduction gear.

2. In an automatic power transmission, a fluid coupling of the Fottinger type, means to transmit power through a train of planetary reduction gear to a tail shaft and also directly from the gear to the driver of the coupling, and means coupled to the runner including a one-way brake adapted to produce a direct drive.

3. In an automatic power transmission, a fluid coupling of the Fottinger type, means to transmit power through a train of reduction gear to a tail shaft and also directly from the gear to the driver of the coupling and means coupled to the runner including a one-way brake operating to reduce the action of the reduction gear as the speed of rotation of the runner increases.

4. In an automatic power transmission, a frame, a drive shaft from a prime mover, a driven shaft, a clutch between the shafts, and a tail shaft, all journalled on the same axis, a pinion on the driven shaft, a carrier on the tail shaft, planetary gears pivoted on the carrier meshing with the pinion, a fluid coupling of the Fottinger type including a driver member and a runner member surrounding the driven shaft, the driver member secured to the carrier, an annulus meshing with the planetary gears connected to the runner member, a one-way brake between the annulus and the frame.

5. In an automatic power transmission, a frame, a fluid coupling of the Fottinger type including a driver member and a runner member, a driven shaft, and a tail shaft, the shafts journalled on the same axis, a pinion on the driven shaft, a carrier on the tail shaft, planetary gears pivoted on the carrier, meshing with the pinion, the fluid coupling surrounding the driven shaft, its driver secured to the carrier, an annulus meshing with the planetary gears connected to its runner, a sleeve extension to the annulus journalled on the tail shaft, a one-way brake between the sleeve and the frame.

6. In an automatic power transmission, a driven shaft, a pinion thereon, a tail shaft, journalled axially therein, a carrier on the tail shaft, meshing with the pinion planetary gears pivoted in the carrier, a fluid coupling of the Fottinger type including a driver member and a runner member, surrounding the driven shaft, its driver secured to the carrier, an annulus meshing with the planetary gears, and connected to its runner, and a one-way brake between the annulus and the machine frame.

7. In an automatic power transmission, a frame, a driven shaft, a pinion at its end, a tail shaft journalled axially in the end of the driven shaft, a flanged extension to the tail shaft forming a carrier, planetary gears pivoted in the carrier, a fluid coupling of the Fottinger type including a driver member and a runner member surrounding the driven shaft, its driver secured to the carrier, an annulus meshing with the planetary gears, connected on one side to the runner which is journalled on the driven shaft, and on the other side to a sleeve journalled on the tail shaft and a one-way brake between the sleeve and the frame.

WILLIAM A. DUFFIELD.